March 23, 1971   H. B. FORNEY   3,572,286
CONTROLLED HEATING OF FILAMENTS
Filed Oct. 9, 1967   5 Sheets-Sheet 5
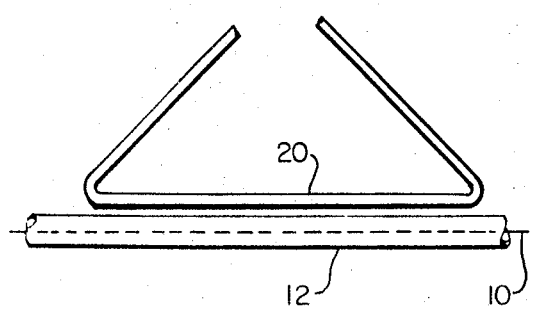
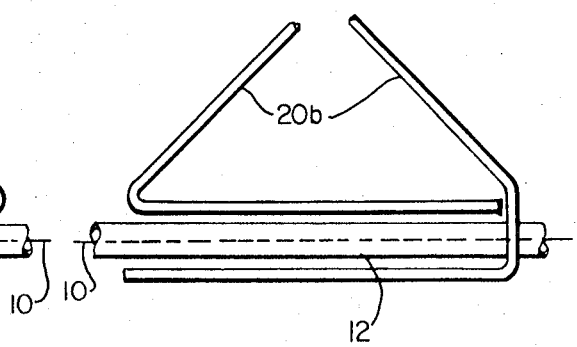
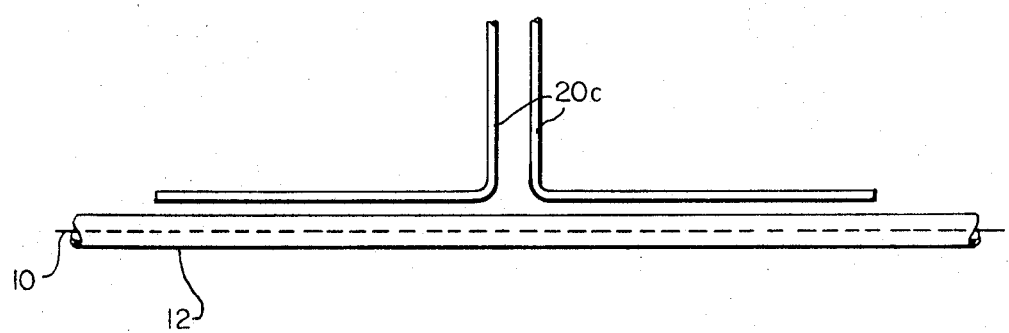
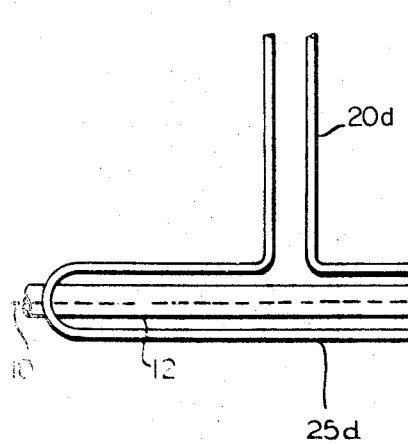
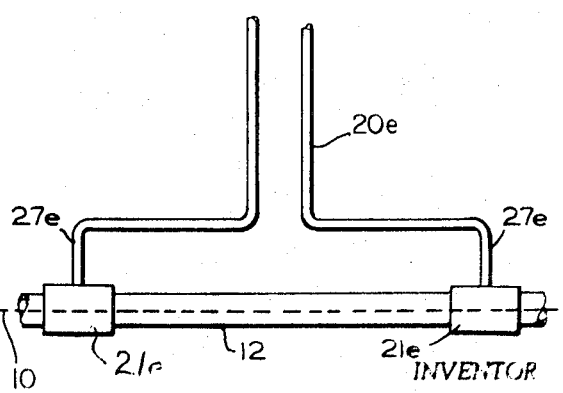
INVENTOR
HARRY B. FORNEY
BY
ATTORNEY

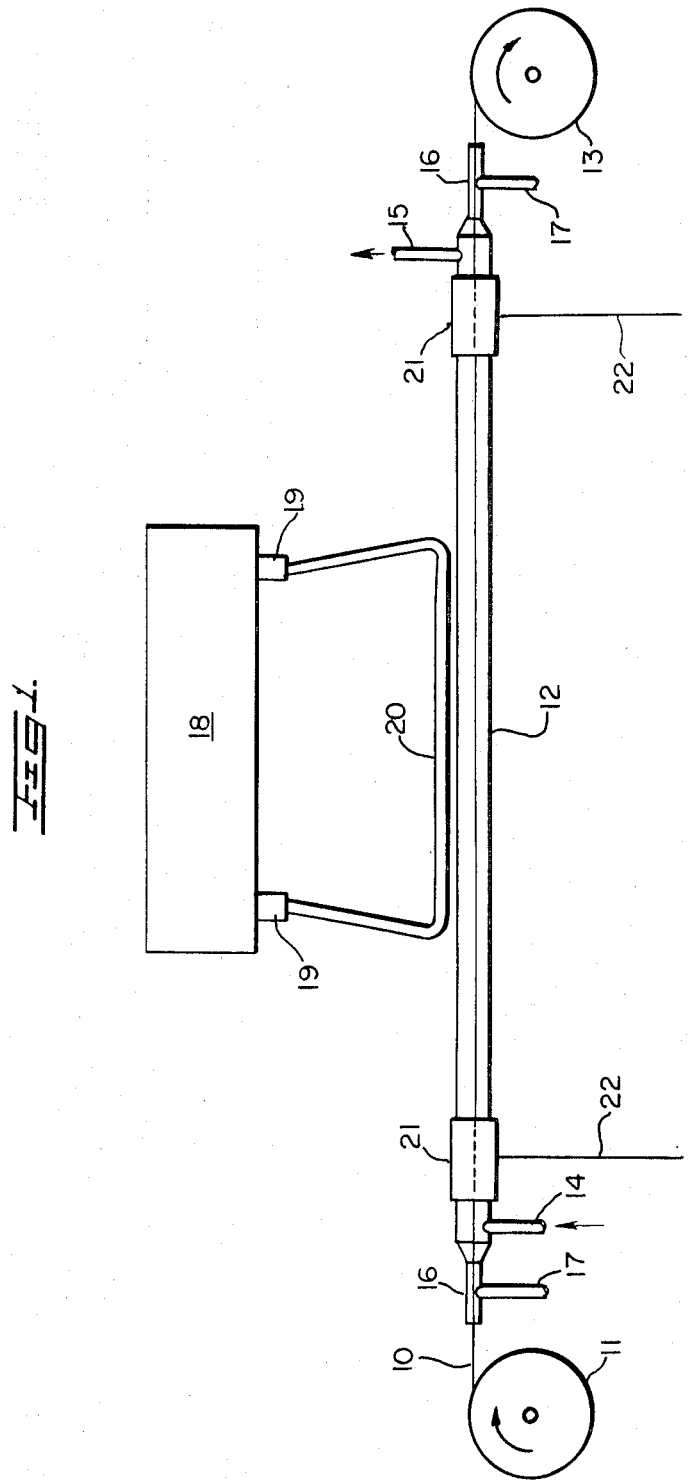

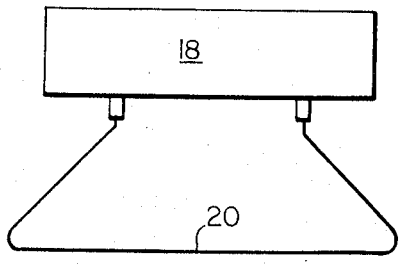
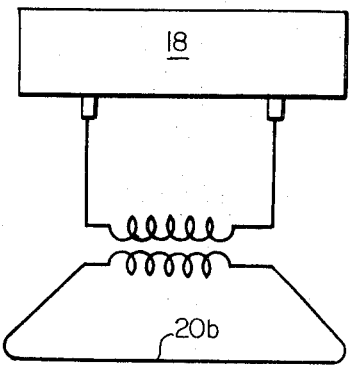
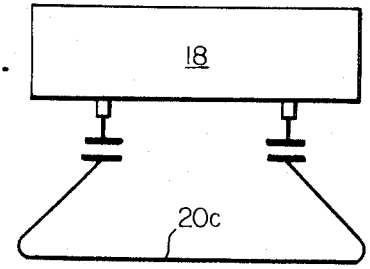
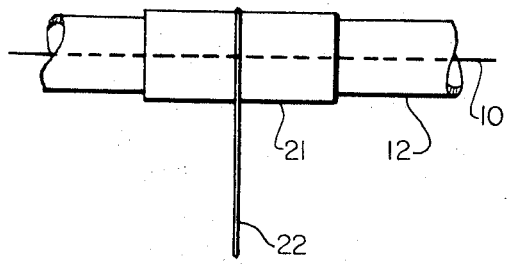
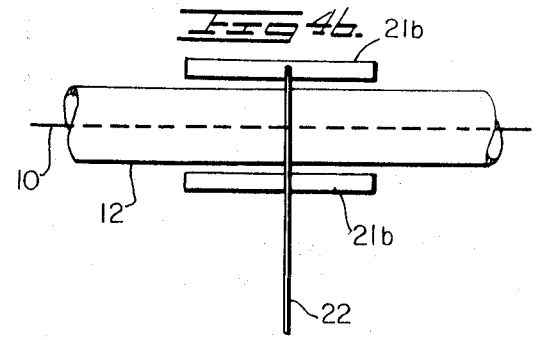
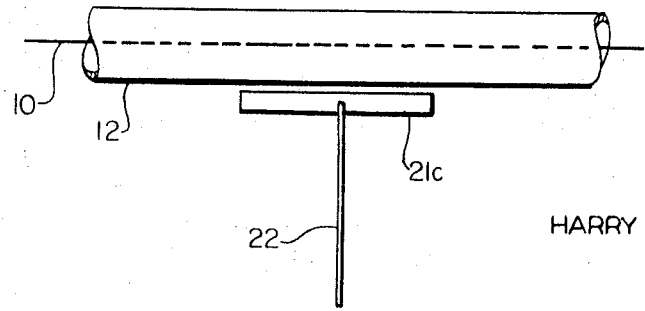

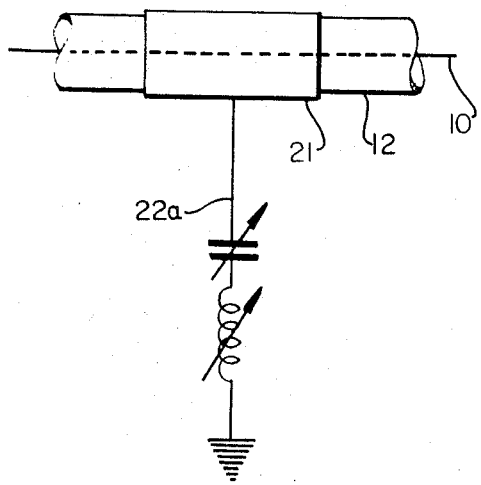
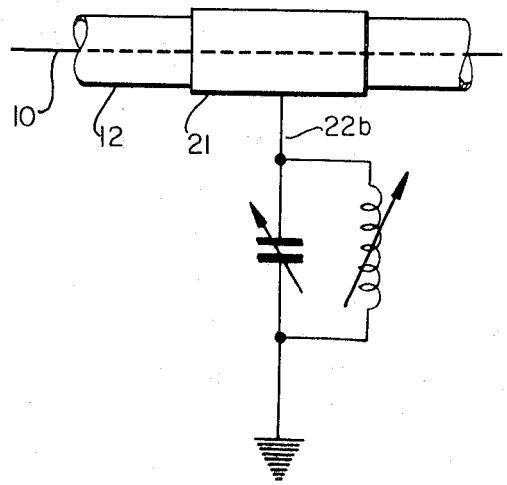
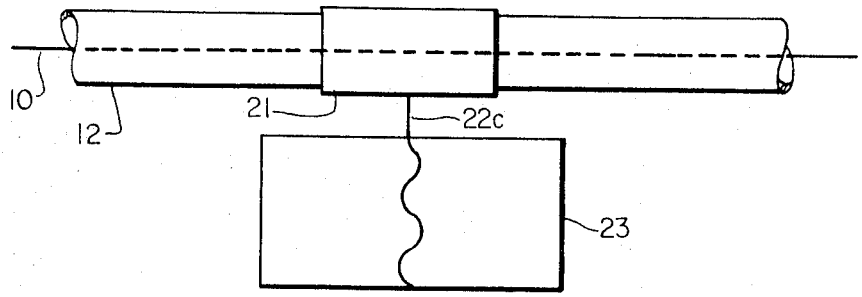
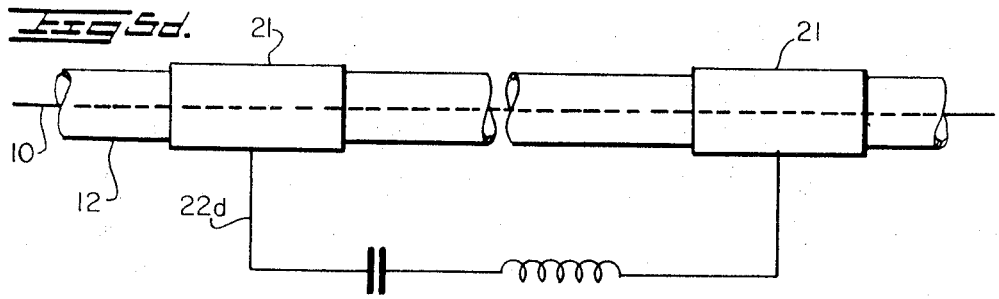

March 23, 1971 H. B. FORNEY 3,572,286
CONTROLLED HEATING OF FILAMENTS
Filed Oct. 9, 1967 5 Sheets-Sheet 5

INVENTOR
HARRY B. FORNEY

BY *Stowell & Stowell*

ATTORNEYS

United States Patent Office 3,572,286
Patented Mar. 23, 1971

3,572,286
CONTROLLED HEATING OF FILAMENTS
Harry B. Forney, Hopewell, Va., assignor to
Texaco Inc., New York, N.Y.
Filed Oct. 9, 1967, Ser. No. 673,570
Int. Cl. C23c 11/00
U.S. Cl. 118—49.5         3 Claims

ABSTRACT OF THE DISCLOSURE

Electrically conductive filaments are heated by establishing in a section of the filament a standing half wave of high frequency current by subjecting the section to be treated to the action of a radio frequency electromagnetic field and controlling the distribution of temperature in such section by adjustment of the parameters of the radio frequency field. The apparatus is useful in the provision of controlled temperature profiles in selected sections of a conductive filament.

---

This invention relates to apparatus for the controlled heating of electrically conductive elongated filaments and is more particularly directed to such methods and apparatus whereby the generation of heat in a finite section of the filament is effected by inducing in such section a standing half wave of electric current by means of a radio frequency electromagnetic field and controlling the distribution of temperature in such section by adjustment of the parameters of the radio frequency field.

The term "filaments" as used herein includes elongated conductors of all cross-sectional shapes and dimensions.

The apparatus of the invention is useful for subjecting elongated filaments to treatment at elevated temperatures particularly when a high degree of uniformity and control are desirable as in coating filaments with a uniform outer layer of a substance by thermal decomposition of a precursor thereof in the ambient atmosphere, as illustrated by the deposition of boron upon a tungsten filament, or upon a carbon-coated silica filament, by thermal decomposition of a boron hydride or of a mixture of a boron halide and hydrogen.

Radio frequency electromagnetic fields of the desired characteristics may be established by positioning the output element of a radio frequency generator adjacent a section of the filament to be heated. The temperature of the filament in such section and its distribution profile can be controlled by selection of the frequency and power of the generator output, the shape and character of the output element of the generator and its position relative to the filament; by the character and position of tuning elements associated with the filament section and by varying the environment of the filament section including the character of the ambient atmosphere.

The invention is particularly useful in the treatment of continuously moving conductive filaments of unlimited lengths wherein the radio frequency electromagnetic field is established in a section of the path of travel of the filament. In addition to making possible controlled temperature distribution in the section of the moving filament under treatment, it makes possible the elimination of difficulties in making electrical contact with the moving filament with solid or liquid contacts.

The principles of the invention will be more fully discussed with reference to the accompanying drawings in which:

FIG. 1 is a semi-diagrammatic representation of apparatus embodying the principles of the invention;

FIGS. 2a, 2b and 2c are diagrammatic representations of various modes of coupling a radio frequency generator to output antennae for use in the invention;

FIGS. 3a, 3b, 3c, 3d and 3e are diagrammatic representations of various forms of radio frequency antennae and modes of coupling them to a filament section;

FIGS. 4a, 4b and 4c are diagrammatic representations of various forms of tuning couplers suitable for use in the invention; and FIGS. 5a through 5d represent various arrangements for effecting power distribution and temperature profile control of the heated filament;

FIGS. 6a, 6b, 6c, 6d and 6e are graphs of various illustrative temperature profiles obtainable with the invention.

Figure 8A:
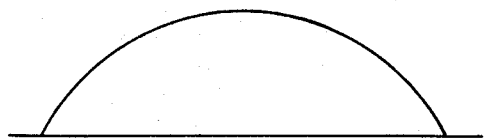
Figure 8B:
Figure 8C:
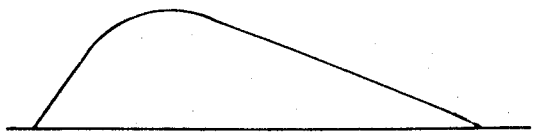
Figure 8D:
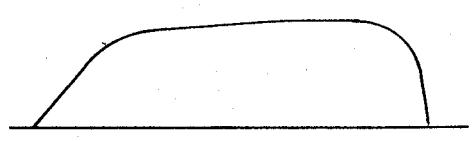
Figure 8E:
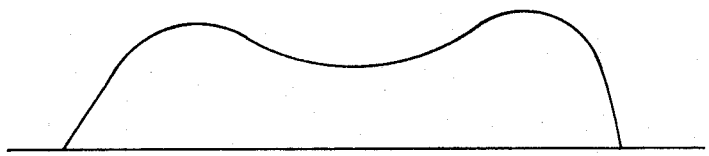

In the apparatus of FIG. 1, filament 10 is fed from let-off reel 11 through dielectric reaction chamber 12 to take-up reel 13. Reactant gases or vapors are introduced into the reaction chamber at inlet 14 and the residual gases pass out of the chamber through outlet 15. Differential pressure seals 16 at each end of the reaction chamber are supplied with an inert gas such as nitrogen or argon through inlets 17 at a pressure slightly greater than the pressure in the chamber.

High frequency current is supplied by radio frequency geneator 18 through connector electrodes 19 to output antenna 20. Typically the output circuit of the generator including the antenna is tuned to resonate at the generator frequency to provide a strong output signal. The electromagnetic flux emanating from the antenna curret cuts across filament 10 and, in accordance with Lenz' law induces a back EMF therein. By means of suitable tuned terminations, illustrated in FIG. 1 as metallic couplers 21 positioned at or within a half wave length separation and carrying tuning stubs 22, a single loop standing wave current, which may include harmonics of the primary frequency, is developed on the filament between the couplers.

The portion of the wire heated and the temperature profile therein are controlled by the power fed to the antenna 20, the location of the couplers 21 and the length and environment of the tuning stubs 22. When the couplers 21 are symmetrically positioned with respect to the antenna 20, the distribution of temperature generated in the filament is symmetrical, being highest at the midpoint between the couplers and tapering off at the ends as shown in FIG. 6a. Displacement of couplers 21 toward the center of the heated section of the filament causes the power to be more uniformly distributed with a decrease in power gradient at the central portion and an increase of power gradient at the end portions thereof giving a longer uniform temperature profile as shown in FIG. 6b.

Asymmetrical distribution of power can be obtained, for example, by positioning one of the couplers 21 closer to the center of the antenna resulting in asymmetrical temperature profiles as shown in FIGS. 6c and 6d.

The power distribution, the temperature profile and the coupling efficiency are also affected by the length, environment and termination of the tuning stubs 22 and variations in these parameters can result in a variety of desirable temperature profiles in the heated section of the filament including the temperature distribution shown in FIG. 6e.

In a representative apparatus, the frequency generator may be a 120 mc. unit such as Radio Frequency Corporation Model 1500B provided with an antenna made of 0.25 inch diameter copper tubing shaped as in FIG. 1 to provide a central section about two feet in length positioned parallel to a ⅞ inch glass reaction tube 12 and the couplers 21 may be 5 inch lengths of one inch diameter aluminum tubing spaced about 4 feet apart on the reaction tube and carrying approximately 3 foot lengths of ordinary insulated 15 amp. wire as tuning stubs 22.

Instead of connecting the antenna directly to the radio frequency generator as shown in FIGS. 1 and 2a, the antenna may be inductively coupled to the generator as shown in FIG. 2b or capacitatively coupled thereto as shown in FIG. 2c.

Other forms of antennae and their relationship to the filament to be heated are shown in FIGS. 3b through 3e.

In FIG. 3d the dielectric reaction chamber 12 is positioned in parallel relation to the loop 25d of the antenna 20d.

In FIG. 3e the legs 27e are connected at their remote ends to the metallic couplers 21e to provide a capacitance coupling for the antenna.

Effective heating can be obtained with frequencies in the range of about 10 to about 200 megacycles per second, the length of the heated zone varying inversely with the frequency.

Instead of the tubular coupler 21 shown in FIGS. 1 and 4a, a pair of parallel metallic strips 21b, as shown in FIG. 4b, or a single strip 21c, as shown in FIG. 4c may be used. A wrapping of aluminum foil provides a good coupler.

The tuning stubs may be grounded through series LC circuits as at 22a in FIG. 5a or through parallel LC circuits as at 22b in FIG. 5b, which circuits may in either case be tuned or tunable or the two couplers 21 may be connected together through a tuned or tunable LC circuit at at 22d in FIG. 5d. The tuning stubs may also be contiguous with a sheet 23 of metal plate or screen as shown in FIG. 5c.

An illustrative use of the apparatus of the invention involves the production of filaments consisting largely of boron or borides by depositing a layer of boron on a suitable substrate by thermal decomposition. For example, in the apparatus of FIG. 1 a half mil diameter tungsten filament 10 was passed through reaction chambers 12 at a speed of 2½ feet per minute. The filament was heated to a maximum temperature of about 2180° F. in the midpoint of the space between couplers 21, the temperature profile being of the shape shown in FIG. 6b with no appreciable heating outside the zone defined by the couplers. A mixture of boron trichloride and hydrogen was passed through the reaction chamber at the rate of 750 cc. of $BCl_3$ and 500 cc. of $H_2$ per minute. Nitrogen was supplied at inlets 17 to provide a seal. The resulting boron coated filament had a diameter of 4.2 mils and a maximum tensile strength of over 600 k.p.s.i.

Instead of a single filament a number of parallel filaments may be heated simultaneously by the method and apparatus of the invention.

The reaction chamber of the apparatus may be horizontal or vertical or it may be positioned at any intermediate angle and it may be preceded or followed by one or more pretreatment or posttreatment chambers or zones.

I claim:

1. Apparatus for heating an elongated electrically conductive filament comprising a dielectric reaction chamber enveloping a section of filament to be heated, a source of radial frequency power, an antenna coupled to said source and extending in power transmitting relation to a finite section of said filament externally of said chamber and tuning elements coupled to said filament adjacent each end of the section thereof to be heated, said elements being tunable with respect to the power supplied by said antenna to establish a standing half wave of current in said section of filament.

2. Apparatus as defined in claim 1 including means for passing the filament longitudinally through the reaction chamber.

3. Apparatus as defined in claim 1 including means for supplying reactant substances to the reaction chamber.

References Cited

UNITED STATES PATENTS

| | | | |
|---|---|---|---|
| 2,625,460 | 1/1953 | Cloud et al. | 219—10.61 |
| 2,887,138 | 3/1959 | Vodonik | 117—107.2X |
| 2,364,526 | 12/1944 | Hansell | 219—10.55X |
| 2,640,142 | 5/1953 | Kinn | 219—10.61X |
| 2,762,894 | 9/1956 | Body et al. | 219—10.61 |

OTHER REFERENCES

Powell et al. Vapor Deposition, 1966, pp. 263 to 269, 346 to 351 relied upon.

Powell et al., Vapor-Plating, The Formation of Coatings by Vapor-Deposition Techniques, John Wiley & Sons, New York, 1955, pp. 106, 107, 108.

ALFRED L. LEAVITT, Primary Examiner

W. E. BALL, Assistant Examiner

U.S. Cl. X.R.

219—10.55, 10.61; 117—93.2, 106